May 9, 1961
T. S. GATES
2,983,375
AUTOMATIC GEAR GAUGING APPARATUS
Filed Nov. 1, 1954
7 Sheets-Sheet 1
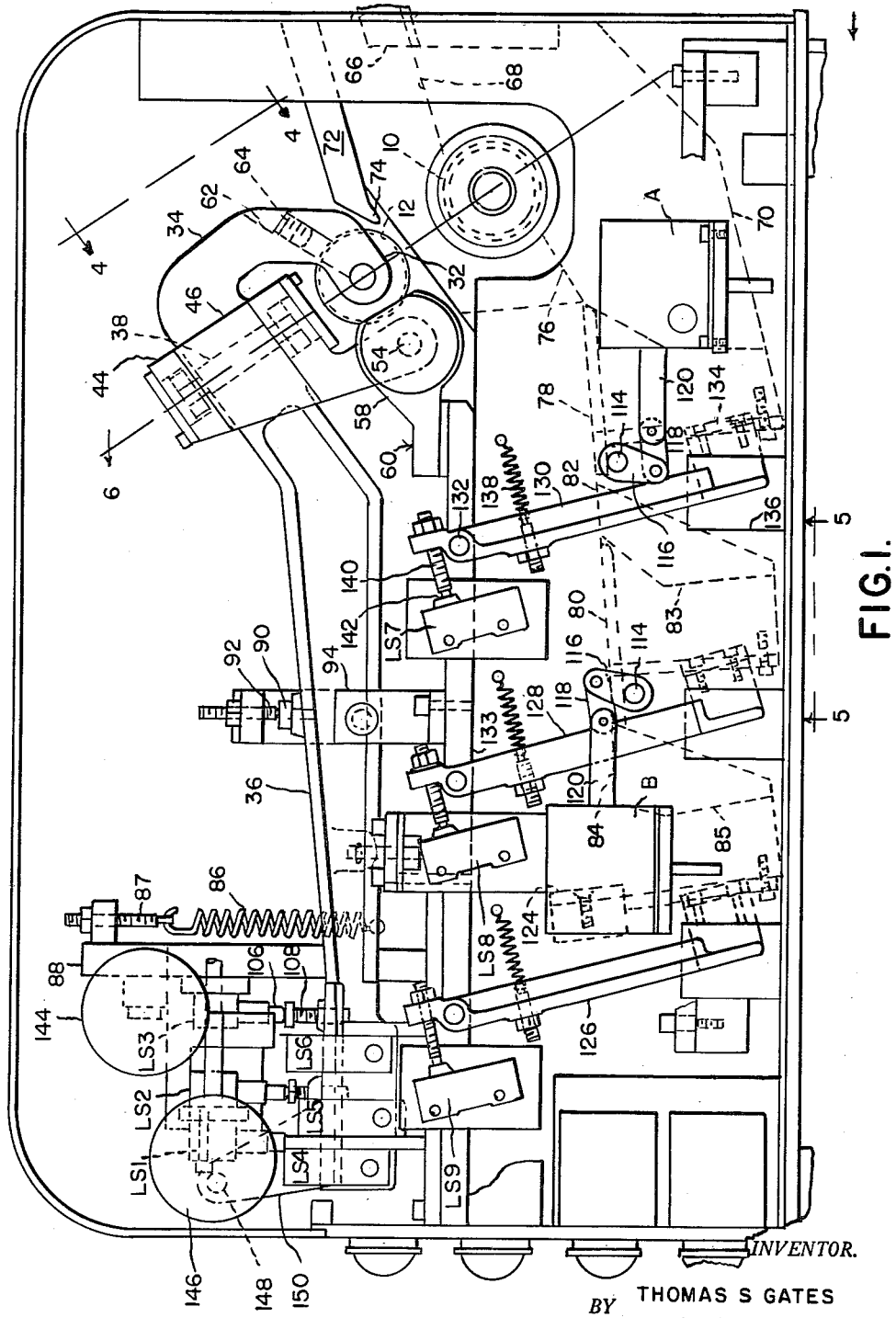
FIG.I.
INVENTOR.
THOMAS S GATES
BY
ATTORNEYS

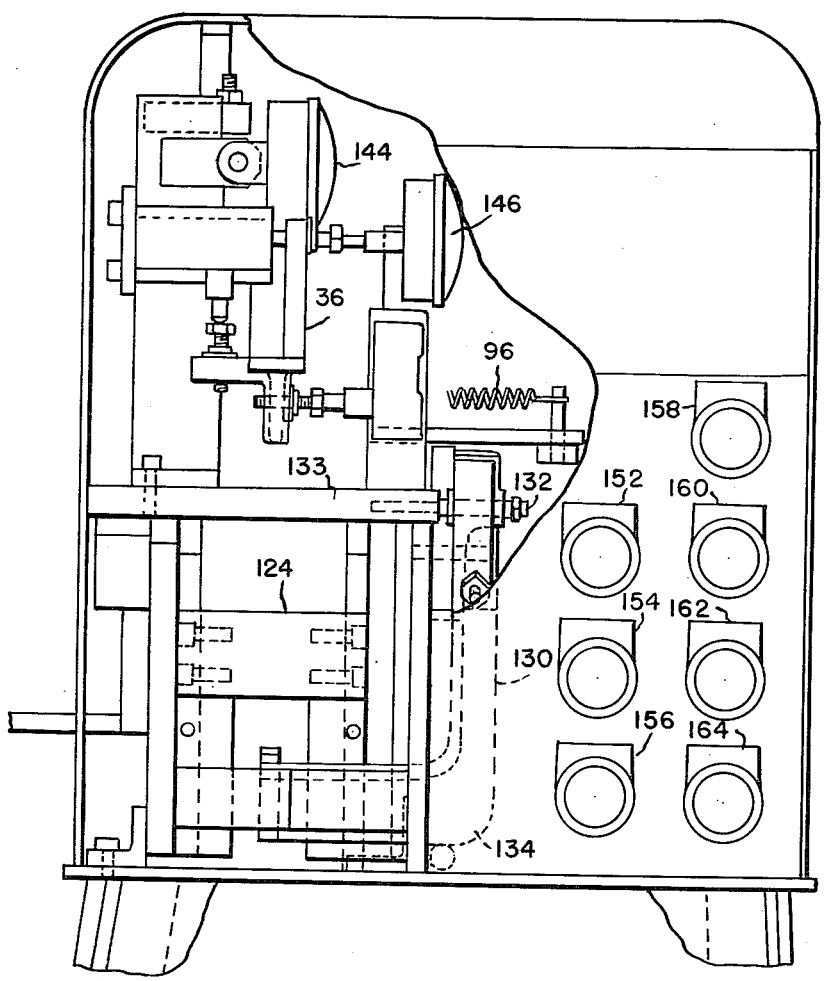

May 9, 1961 T. S. GATES 2,983,375
AUTOMATIC GEAR GAUGING APPARATUS
Filed Nov. 1, 1954 7 Sheets-Sheet 3
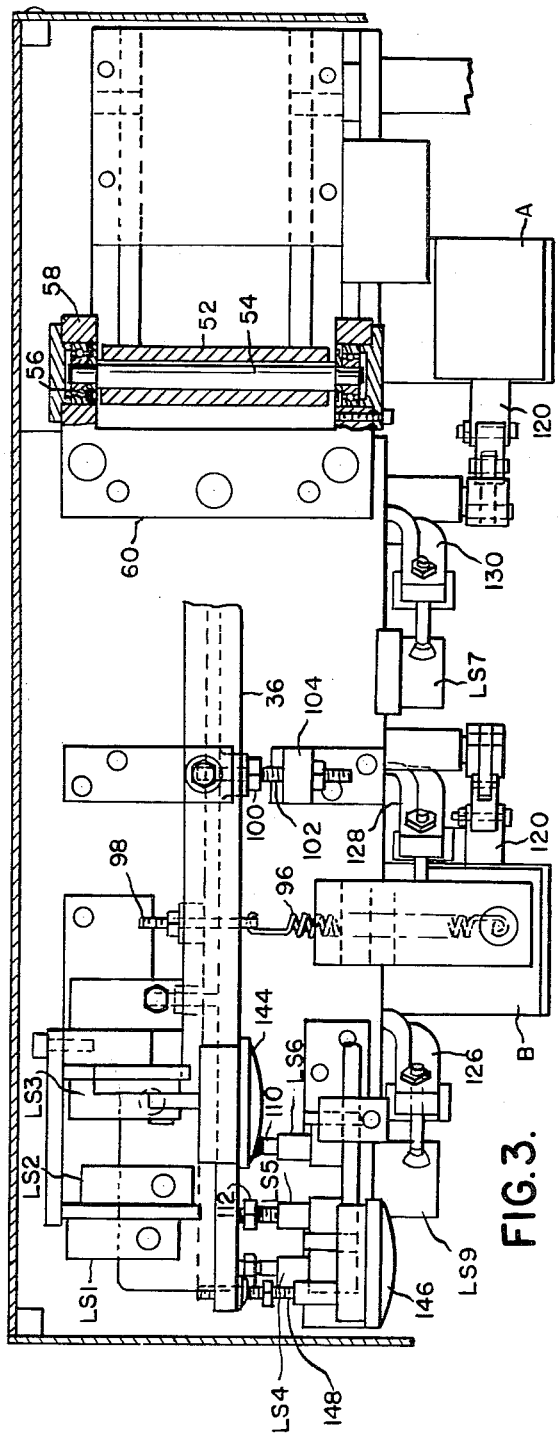
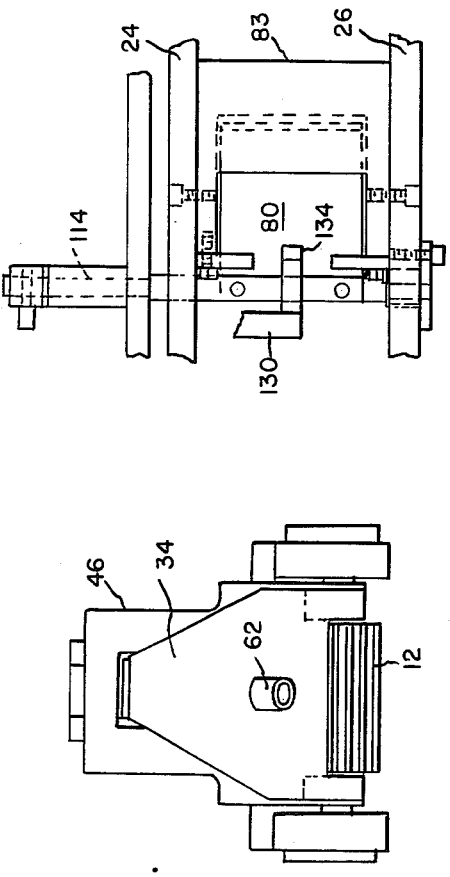
*INVENTOR.*
THOMAS S. GATES
BY
*Whittemore Hulbert & Belknap*
ATTORNEYS

INVENTOR.
THOMAS S. GATES

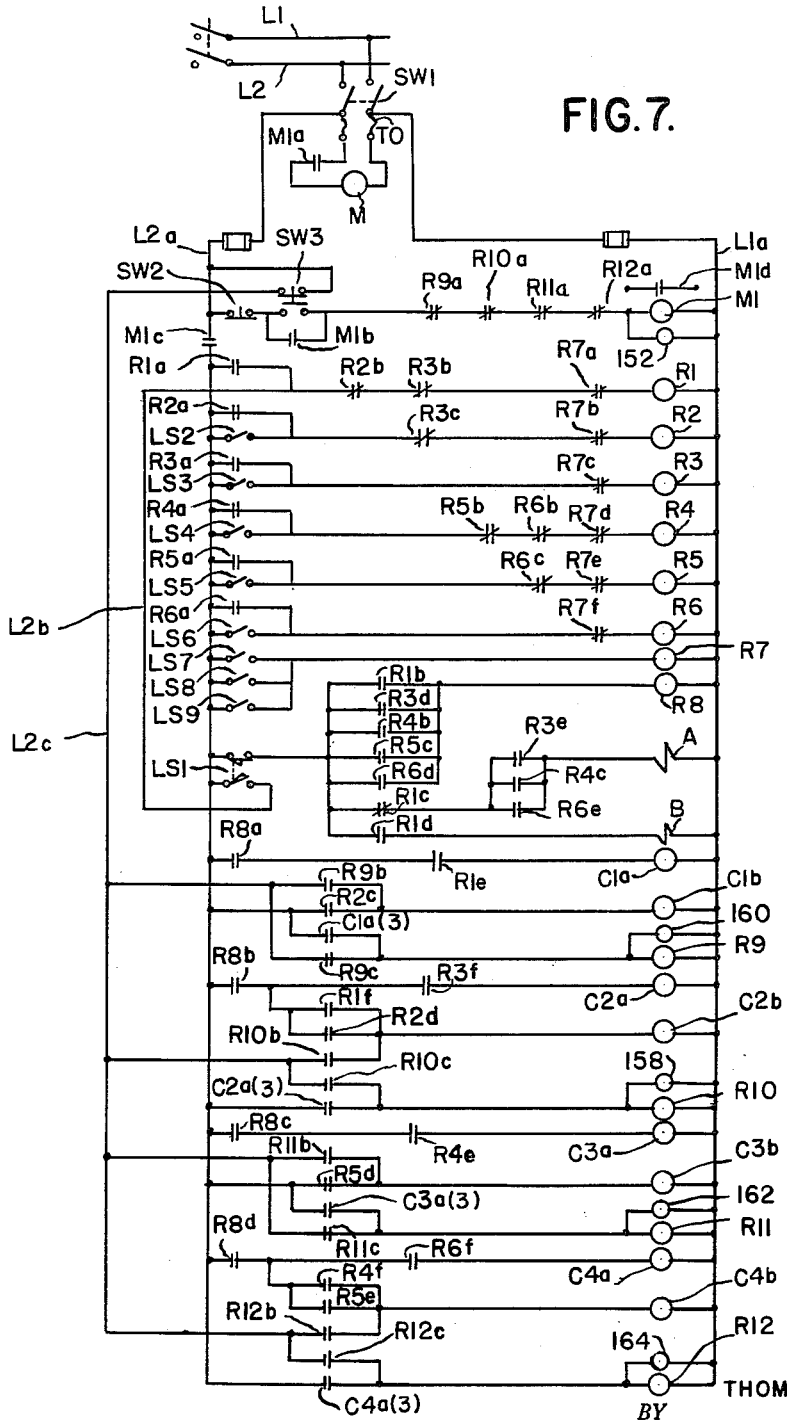

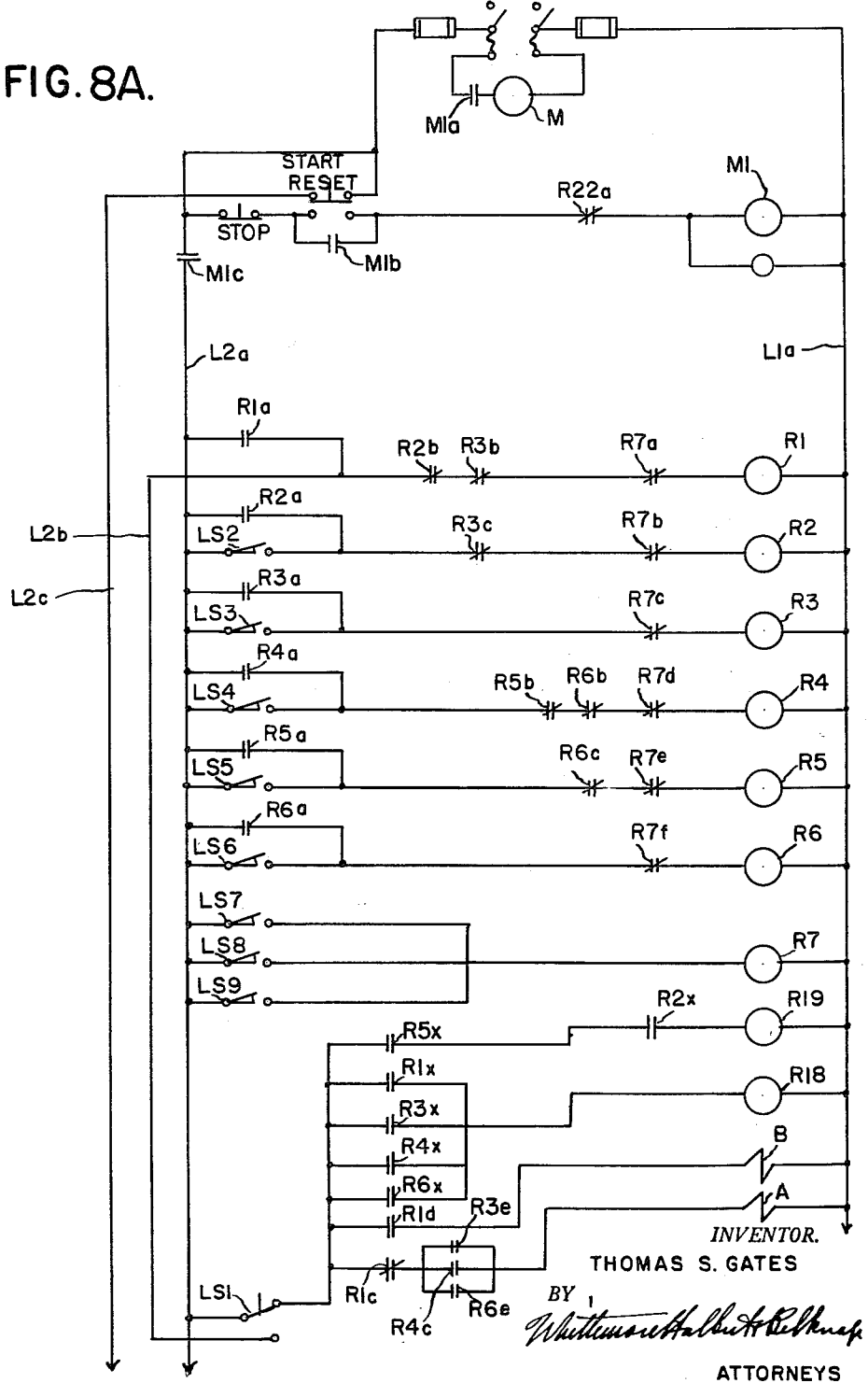

May 9, 1961 T. S. GATES 2,983,375
AUTOMATIC GEAR GAUGING APPARATUS
Filed Nov. 1, 1954 7 Sheets-Sheet 7

INVENTOR.
THOMAS S. GATES
BY
*Whittemore Hulbert & Belknap*
ATTORNEYS

United States Patent Office 2,983,375
Patented May 9, 1961

2,983,375

AUTOMATIC GEAR GAUGING APPARATUS

Thomas S. Gates, Grosse Pointe Woods, Mich., assignor to National Broach & Machine Company, Detroit, Mich., a corporation of Michigan Filed Nov. 1, 1954, Ser. No. 466,118

32 Claims. (Cl. 209—88)

The present invention relates to gear gauging apparatus, and more particularly to automatic apparatus for gauging a series of gears, and for separating the gears into those within acceptable limits as to size and helix angle and those outside of such limits.

More specifically, it is an object of the present invention to provide automatic gear gauging apparatus designed to gauge a series of gears and to separate gears which are either undersize or oversize and off-angle in either direction as to helix angle from those within acceptable limits.

It is a further object of the present invention to provide gear gauging apparatus designed to separate a series of gears into three groups one of which comprises gears within acceptable limits as to size and helix angle, the second of which comprises salvageable gears which are oversize or are off-angle as to helix angle, and the third of which comprises scrap gears which are undersize.

It is a further object of the present invention to provide automatic gear gauging apparatus comprising a pair of master gears disposed in laterally spaced relation with their axes substantially parallel and adapted to have a gear to be gauged passed therebetween in meshing relation therewith, means mounting said master gears for relative approach and separation so as to determine size of the gear being gauged, said gears being mounted for relative angular movement about an axis perpendicular to and intersecting the axes of said master gears to provide means for determining the helix angle of a gear passed therebetween.

It is a further object of the present invention to provide gear gauging apparatus comprising a first master gear, means for rotating said master gear at a slow speed, a second master gear located adjacent said first master gear in spaced relation thereto with its axis substantially parallel thereto, means mounting said second master gear for angular movement about an axis perpendicular to and passing through the axes of both master gears and for rocking movement about an axis parallel to and spaced from the axis of said first master gear in a position to provide for movement of said second master gear substantially toward and away from said first master gear.

It is a further object of the present invention to provide gear gauging apparatus as described in the preceding paragraph, in combination with an arm secured to said second master gear for movement therewith, and measuring and control devices associated with the end of the arm remote from said second master gear.

It is a further object of the present invention to provide gear gauging apparatus comprising means for sensing gears which are oversize or undersize and for sensing gears which are off-angle in either direction with respect to helix angle, means for advancing a series of gears after gauging, and means under the control of the sensing means for separating said gears in accordance with their gear characteristics.

It is a further object of the present invention to provide automatic means for determining deviation from a plurality of predetermined gear characteristics, and means for preventing continued operation of the gear gauging apparatus when any predetermined number of consecutive gears exhibits the same deviation from predetermined gear characteristics.

Other objects and features of the invention will become apparent as the description proceeds, especially when taken in conjunction with the accompanying drawings, wherein:

Figure 1 is a side elevational view of the gear gauging apparatus with the cover plate removed.

Figure 2 is an end view of the gear gauging apparatus as seen from the left in Figure 1, with a portion of the cover plate broken away.

Figure 3 is a fragmentary plan view of the gear gauging apparatus, with parts broken away.

Figure 4 is a fragmentary elevational view looking in the direction of the arrows 4—4, Figure 1.

Figure 5 is a fragmentary elevational view looking in the direction of the arrows 5—5, Figure 1.

Figure 7 is a simplified wiring diagram of the circuit employed in the gear gauging apparatus.

Figure 8B:
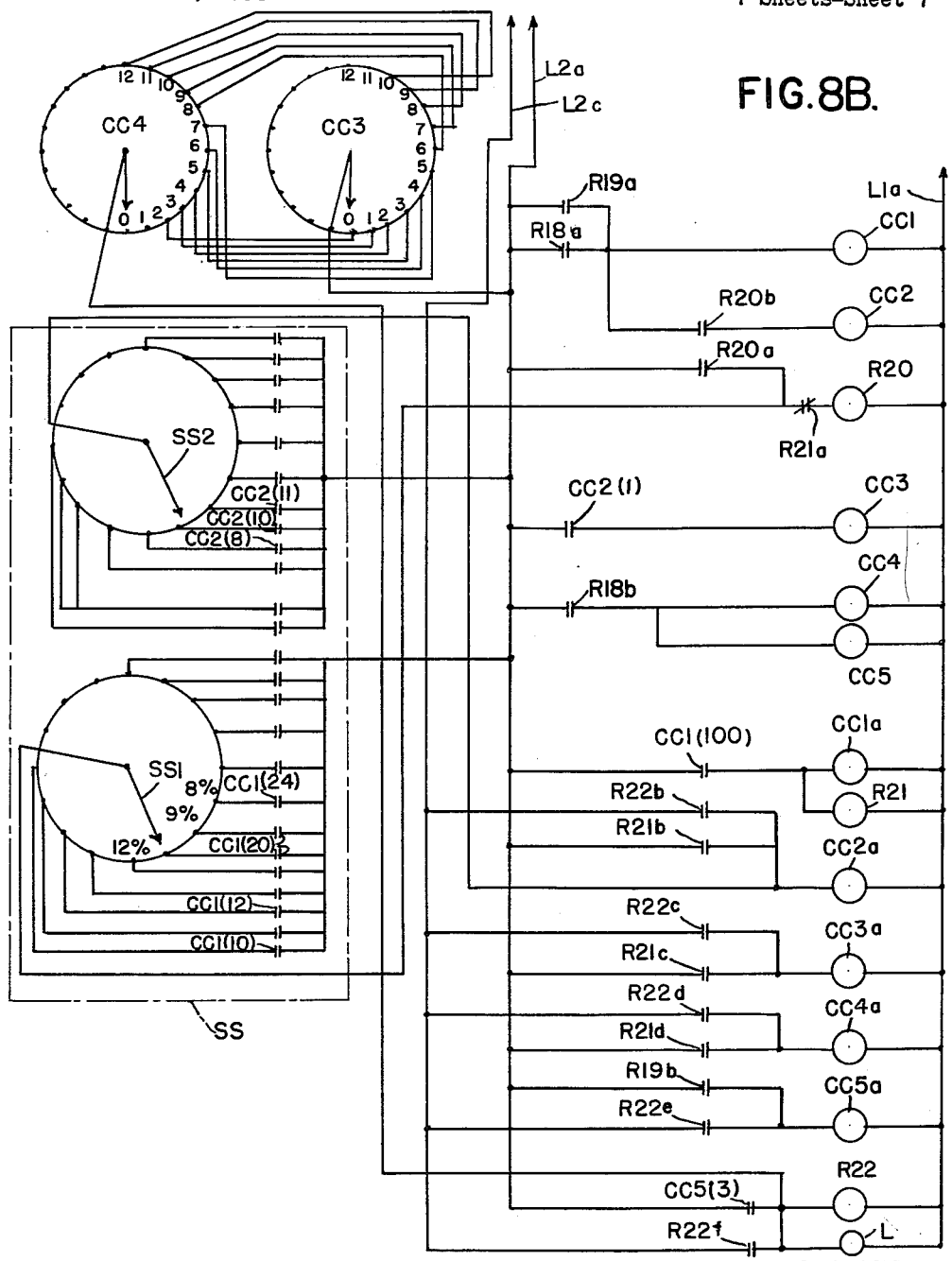

Figures 8A and 8B together are a second wiring diagram.

The gear gauging apparatus disclosed in the several figures is intended to gauge a series of gears as finished by a gear finishing operation, such for example as a gear shaving operation. In a typical setup an automatic gear shaving machine is arranged to discharge finished gears onto a chute or trackway which advances the gears to the gear gauging apparatus. In order to control the sequence of gauging in an orderly manner, a suitable gate may be provided which admits the gears one at a time to the gauging apparatus. This gate may conveniently be under the control of a solenoid actuated by exit from the gauging apparatus of the gear previously gauged. Since the gauge is or may be intended to shut down the shaving machine, it is desirable that gears be gauged substantially as they are finished by the shaving machine.

The gauging apparatus comprises a pair of master gears 10 and 12, the gear 10 being mounted on a shaft 14 journaled in bearings 16 and 18 received in bosses 20 and 22 respectively of side plates 24 and 26. Connected to the shaft 14 by a flexible coupling indicated at 28 is motor means indicated generally at 30 adapted to drive the master gear 10 in continuous slow rotation.

Figure 6:
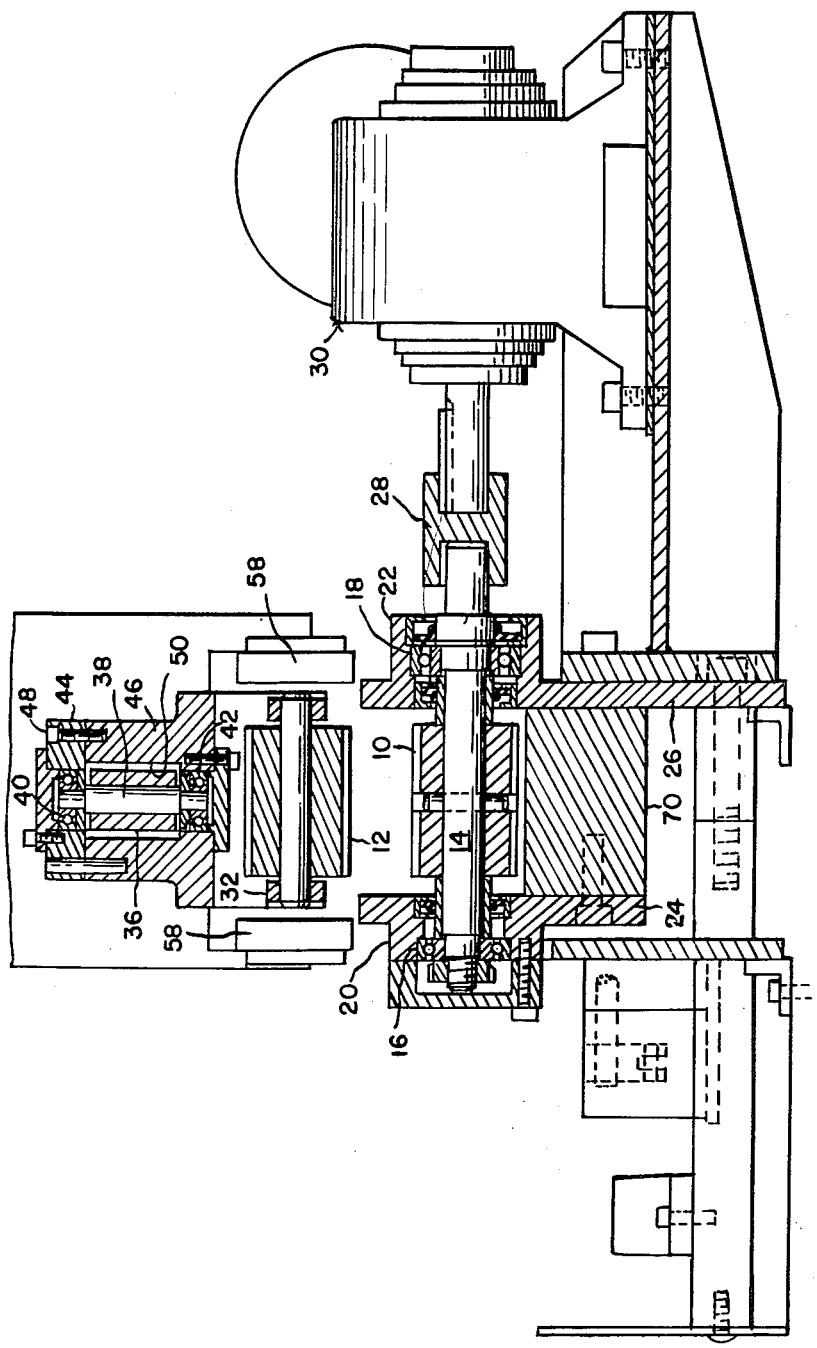
Figure 6 is a fragmentary sectional view on the line 6—6, Figure 1.

The master gear 12 is located adjacent to the master gear 10 with its axis generally parallel thereto, thereby providing a space between the master gears 10 and 12 through which a series of gears to be checked or gauged are passed. The master gear 12 is journaled between arms 32 at the end of a gooseneck 34 provided on a relatively long measuring or gauging arm 36 which preferably is formed of a cast light metal such for example as aluminum or magnesium. The purpose of providing the long arm 36 is to magnify or amplify movements of the master gear 12 resulting from checking or gauging of work gears. The arm 36 is journaled for angular adjustment about the axis of a pivot shaft 38 as best seen in Figure 6. The ends of the pivot shaft 38 are received in bearings indicated generally at 40 and 42, the former being contained in a cap 44 secured to a bracket 46 by suitable means such as the screws indicated at 48, and the latter being received at the lower end of a stepped bored passage 50 in the bracket.

The bracket 46 in turn includes a sleeve portion 52 carrying a pivot pin 54 the ends of which are received in bearings 56 which in turn are mounted in openings in ears 58 of a fixed mounting bracket 60.

It will be observed that the axis of the pivot shaft 38 is perpendicular to and intersects the axes of the master gears 10 and 12 when the master gear 12 is in an intermediate position. It will further be observed that the axis of the pivot pin 54 is generally parallel to the axes of the master gears 10 and 12 and is located such that as the bracket 46 rocks about the axis of the pivot pin 54, the master gear 12 moves generally toward and away from the master gear 10. Extending through a partially tapped opening 62 in the gooseneck 34 of the arm 36 is a screw 64 associated with a soft plug in advance of the screw which is forced by the screw against the periphery of the master gear 12 to prevent rotation thereof. By loosening the screw, the master gear 12 may be rotated from time to time to new positions to compensate for any wear.

The gears to be checked are led to the gear gauging apparatus along a suitable chute or trackway, a portion of which is indicated at 66, whence the gears pass to a surface 68 formed in a block 70 received between the side plates 24 and 26, as best illustrated in Figure 6, the surface being inclined so that the gears advance into contact with the rotating master gear 10. It will be recalled that gears are advanced singly to the apparatus. As the gear to be gauged engages the master gear 10, it may or may not at the first instant become meshed therewith and a plate 72 having a nose portion 74 is provided which prevents the gear being gauged from contacting the upper master gear 12 until it has become fully meshed with the lower rotating master gear 10.

As the gear to be gauged passes through the space between the master gears 10 and 12, the teeth of the master gear 12 will enter into the spaces in the gear being gauged and will swing the arm 36 about the axis of the pivot pin or shaft 38 to a point determined by the actual helix angle of the teeth on the gear being gauged. At the same time as the gear being gauged passes through the space between the master gears, the master gear 12 will be moved about the axis of the pivot pin 54 to a position determined by the size or pitch diameter of the gear being gauged.

After the gear being gauged has passed through the space between the master gears it drops to surface 76 of the block 70 and thence rolls downwardly and to the left, as seen in Figure 1, over trap doors 78 and 80, and thence drops off the trackway formed by the surface 76, the trap door 78, the surface 82 of a block 83, the trap door 80, and the surface 84 of a block 85 to a conveyor or receptacle for receiving gears within acceptable limits as to size and helix angle. As will subsequently be described, either of the trap doors 78 or 80 may be projected to an open position in which they block passage of the gauged gear and cause it to drop down to a conveyor or receptacle for the reception of rejected gears.

The arm 36 has connected thereto a tension spring 86 the upper end of which is connected to an adjustable screw 87 carried by a pivot 88. The spring 86 biases the arm 36 clockwise as seen in Figure 1, to a position in which an abutment 90 thereon engages an adjustable abutment screw 92 carried by a post 94. Adjustment of the screw 92 predetermines the position of the master gear 12 prior to engagement therewith of a gear being gauged. This adjustment is normally such that passage of even an abnormally undersize gear will result in counterclockwise rocking movement of the arm 36 as seen in Figure 1.

Similarly, the arm 36 has connected therewith a second spring 96 carried by an adjustable screw 98 secured to the arm 36. The spring 96 is adapted to bias the arm 36 to bring about contact between an abutment 100 on the arm and an adjustable abutment screw 102 on a post 104. Adjustment of the screw 102 is such that passage of a gear with a left hand helix angle error will move the arm 36 a predetermined distance, passage of a gear of correct helix angle will move the arm 36 a further distance, and passage of a gear with right hand helix angle error will move the arm 36 even further in the same direction about the axis of the pivot pin 38.

The spring 86 is somewhat stronger than the spring 96 so as to insure that errors of helix angle will appear as such and not appear as errors in size as might otherwise occur. It will be understood that with off-helix condition and without the provision for yielding movement about the axis of the pivot pin or shaft 38, full meshing between the gear being gauged and the master gear 12 would be prevented and this would appear as an error in size. With the spring 86 however, sufficiently stronger than the spring 96, full meshing of the teeth is caused irrespective of what errors exist so that any existing error in helix angle will result in the correct lateral displacement of the arm 36.

It follows from the foregoing that in order to obtain a true sensing of the actual size of the gear being gauged, it is necessary to mount the master gear 12 so that it may swing about an axis perpendicular to and intersecting the axes of the master gear 12, the work gear, and the master gear 10 when the axes of these gears are all in substantial alignment. The gear being gauged will adjust itself to the helix angle of the master gear 10 and will move into full depth with respect thereto. The master gear 12 will in turn adjust itself to the angularity of the teeth being gauged by swinging about the axis of the pin 38 and will thus move into mesh at full depth therewith, thus affording a true indication or measurement of size or pitch diameter of the gear being gauged. As disclosed herein, the swinging movement of the arm 36 about the axis of the pin 38 may be employed to provide an indication of helix angle error. It will be appreciated of course that the control means responsive to swinging movement of the arm 36 about the axis of the pin 38 may be adjusted to be sensitive to greater or lesser helix angle error as required by the particular gauging operation being performed. In a proper case the control means responsive to helix angle error may be set with such an extreme tolerance that in effect gears will not be rejected for helix angle error. In this case the angular movement of the arm 36 about the axis of the pin 38 may be considered as provided for the sole purpose of permitting full meshing engagement between the master gears and the gear being gauged so as to obtain a true indication of gear size without reference to helix angle error.

Associated with the arm 36 and cooperating therewith to sense or measure size of the gear being gauged are condition limit switches LS1, LS2 and LS3, these switches having plungers indicated generally at 106 actuated by adjustable screws 108 on the arm 36. Also associated with the arm 36 for measuring errors in helix angle are condition limit switches LS4, LS5 and LS6 which include plungers indicated generally at 110 actuated by adjustable abutment screws 112 carried by the arm 36.

Means are provided for actuating the trap doors 78 and 80 and these means comprise solenoids A and B respectively. The trap doors 78 and 80 are carried by pivot pins 114 having cranks 116 connected thereto, the cranks being connected by links 118 with the plungers 120 of the solenoids A and B. The arrangement is such that when the solenoid A or B is energized, the trap door 78 or 80 is swung upwardly about the axis of the pivot mountings 114, leaving openings through which the gauged gears may descend and also forming barriers to further passage of the gears along the trackway of which the trap doors are a part.

The trap doors 78 and 80 each cover an escape exit for gauged gears and gears which pass the trap doors 78 and 80 roll off the end of the surface 82 as previously described. An abutment plate 124 is provided to limit movement of gears and to cause them to fall directly downwardly off the end of the surface 82. In order to provide means which sense the movement of a gear downwardly through the space vacated by the trap door 78, the trap door 80, or through the space at the end of the trackway, identical means are provided, only one of which will be described in detail. These means comprise levers 126, 128 and 130 which are mounted for rocking movement about pivot pins 132 carried by a horizontal support plate 133 and which include angularly bent portions indicated generally at 134 at the bottom thereof extending through openings 136 into the path of movement of the gears. Spring means 138 are provided which bias the levers 130 into a position in which adjustable screws 140 engage plungers 142 of position limit switches LS7, LS8 and LS9 which are actuated by the levers 130, 128 and 126 respectively.

In general, the arrangement is such that as a gear passes between the master gears 10 and 12 the arm 36 is swung so as to actuate one or more of the condition limit switches LS1, LS2 and LS3 and to actuate one or more of the condition limit switches LS4, LS5 and LS6. Dependent upon which of these limit switches have been actuated, one of the trap doors 78 or 80 may be raised or both may remain closed. If the trap door 78 is elevated the gauged gear drops through the opening normally covered by the trap door 78 and trips the lever 130 thereby actuating position limit switch LS7. If the trap door 80 has been raised a gear drops through the space vacated by this trap door and engages the lever 128 thereby actuating position limit switch LS8. If neither of the trap doors have been elevated the gear rolls off the end of the trackway and trips the lever 126 thereby actuating position limit switch LS9. Actuation of position limit switches LS7, LS8 or LS9 signals the completion of a gauging operation and that the gauging apparatus is ready to receive a subsequent gear for gauging. As will subsequently be described in conjunction with the circuit, actuation of any one of these last mentioned limit switches also resets the device for gauging the succeeding gear.

Suitable indicating gauges 144 and 146 may be provided. The gauge 146 includes a plunger 148 adapted to be actuated by a fishtail 150 secured to the movable end of the arm 36. The indicating gauge 144 includes a plunger actuated by means on the arm 36 in line with the adjustable abutment screw 108. The indicators are used primarily for the purpose of setup.

Indicating lights are provided at the front of the gauging apparatus and as illustrated in Figure 2 may comprise a light 152 designated "Gauge On," a switch 154 designated "Start," a switch 156 designated "Stop," a light 158 designated "Oversize," a light 160 designated "Undersize," a light 162 designated "Off Helix Left," and a light 164 designated "Off Helix Right."

Referring now to Figure 7 there is illustrated the circuit interconnecting the various limit switches and solenoids previously referred to. The circuit includes lines L1 and L2 connected through a switch SW1 to lines L1a and L2a respectively. Connected across the switch through thermal overload devices TO is a motor M controlled by contacts M1a of a master relay M1. Extending between lines L2a and L1a is a stop switch SW2, the contacts of a start-reset switch SW3, and normally closed contacts R9a, R10a, R11a and R12a of relays R9, R10, R11 and R12 subsequently to be described, and master relay M1. Normally open contacts M1b of relay M1 are connected around the start contacts of the switch SW3 and signal light 152 is connected in parallel with the master relay M1.

The normally open contacts shown directly above master relay M1 and designated M1d are intended to be connected into the control circuit for gear finishing or manufacturing equipment. One of the important functions of the present gear gauging apparatus is in a fully automatic gear making or gear finishing system. Thus for example, the present gear gauging apparatus may be associated with a gear finishing machine such for example as a gear shaving machine, which is fully automatic and is adapted to discharge finished gears to the gauging device.

The gauging device is effective to gauge all gears finished by the gear finishing machine or machines for size and helix angle may be used to interrupt automatic operation of the machine or machines or to effect an automatic adjustment thereof, when a predetermined number of consecutive gears have exhibited the same error. If no automatic correction is made, the complete line shuts down and a signal light remains on showing the operator what defect caused the shutdown. The operator then corrects the machine setting which led to the shutdown and presses the start-reset switch which resets and starts the gauging apparatus and allows the gear finishing apparatus to be restored.

From the foregoing it will be apparent that when the start-reset switch SW3 is depressed into engagement with the lower pair of contacts, a circuit is completed through the stop switch SW2, the normally closed contacts of the relays referred to above, and the master relay M1. Energization of relay M1 closes normally open contacts M1a, thus energizing the motor M and also closing normally open contacts M1b and M1c. Closure of contacts M1b establishes a holding circuit around the lower pair of contacts of the start-reset switch SW3, and closure of contacts M1c energizes the circuit to the various limit switches, as will now be described.

It will be recalled that condition limit switches LS1, LS2 and LS3 are adapted to be actuated in sequence as a gear passes through the space between the master gears if the gear is oversize. An undersize gear actuates limit switch LS1. If the gear is of the required size limit switches LS1 and LS2 are actuated in sequence but limit switch LS3 is not actuated. Limit switch LS1 is provided with two sets of contacts and will move from the illustrated position to the lower position upon initial movement of the arm 36. This completes a circuit from line L2a to line L1a, through normally closed relay contacts R2b, R3b, and R7a, to relay R1. Energization of relay R1 closes normally open contacts relay R1a, thus establishing a holding circuit for relay R1 independent of condition limit switch LS1. In addition, energization of relay R1 also closes normally open contacts R1b, R1d, R1e, and R1f and opens normally closed contacts R1c.

Condition limit switch LS2 is connected between lines L2a and L1a in series with normally closed contacts R3c, R7b, and relay R2. Relay R2 when energized closes normally open contacts R2a which are connected around limit switch LS2 to establish a holding circuit for relay R2 independent of limit switch LS2. In addition, energization of relay R2 opens normally closed contacts R2b in series with relay R1 and thus, when relay R2 is energized, relay R1 is de-energized. Also, normally open contacts R2c and R2d are provided, in series respectively, with counter reset coils C1b and C2b.

Condition limit switch LS3 is also connected between lines L2a and L1a and is in series with normally closed contacts R7c of relay R7 and with relay R3. Energization of relay R3 closes normally open contacts R3a which are connected around limit switch LS3 to establish a holding circuit for a relay R3 independent of the limit switch LS3, and opens normally closed contacts R3b and R3c, thus breaking the circuits to relays R1 and R2. Normally open contacts R3d and R3e are also closed by energization of relay R3.

With the three branch circuits including relays R1, R2 and R3, it will be observed that initial movement of the arm 36 reverses condition limit switch LS1 from the position shown in the figures and will energize relay R1. Further movement of the arm 36 closes condition switch LS2 which will de-energize relay R1. Still further movement of the arm 36 will operate condition limit switch LS3 to close relay R3 which will de-energize relay R2. Accordingly, if an undersize gear passes between the master gears 10 and 12, relay R1 becomes and remains energized. If a normal size gear passes between the master gears, relay R2 remains energized and relays R1 and R3 are not energized at this time. If an oversize gear passes between the master gears, relay R3 remains energized and relays R1 and R2 are de-energized. From this standpoint it will be appreciated that condition limit switches LS1, LS2 and LS3 cooperate to control the gauging apparatus in accordance with the size of the gear, limit switch LS1 having the additional function of delaying operation of the solenoids and counting mechanism later to be described, until the gear being gauged has passed the master gears.

In like manner, condition switches LS4, LS5 and LS6 are responsive to helix angle, each being in series with relays R4, R5 and R6 respectively. The circuit including the relay R4 includes normally closed contacts R5b, R6b and R7d. The circuit including the relay R5 includes normally closed contacts R6c and R7e. The circuit including the relay R6 includes normally closed contacts R7f. The arrangement is such that a gear which exhibits an off-helix angle to the left operates limit switch LS4. If the gear being gauged has the correct helix angle, arm 36 is moved further so as to actuate limit switch LS5. If the gear being gauged exhibits a helix angle error to the right, limit switch LS6 is actuated. The arrangement is such that if limit switch LS6 is actuated, energization of relay R6 opens normally closed contacts R6c and de-energizes relay R5. In like manner, when limit switch LS5 is actuated, energization of relay R5 opens normally closed contacts R5b, thus deenergizing relay R4. Normally open holding contacts R4a, R5a and R6a are in parallel with limit switches LS4, LS5 and LS6 respectively, and complete circuits to relays R4, R5 and R6 respectively, irrespective of the limit switches.

Position limit switches LS7, LS8 and LS9 are connected in parallel between the lines L2a and L1a and are in series with relay R7. As a result of this a gear actuating any of the levers 126, 128 or 130 on its exit from the apparatus will close relay R7, thus opening the normally closed contacts R7a, R7b, R7c, R7d, R7e and R7f, and thus opening whichever of the relays R1 through R6 which remains energized at this time.

It will be observed that the upper pair of contacts of condition limit switch LS1, which are closed after the gear being gauged has passed between the master gears 10 and 12, connects to a group of normally open contacts R1b, R3d, R4b R5c and R6d, disposed in parallel between the upper contacts of limit switches LS1 and a relay R8. The relay R8 controls normally open contacts R8a, R8b, R8c and R8d which respectively control counting circuits later to be described. In addition, two parallel branch circuits to the solenoids A and B are connected in series with the upper contacts of limit switch LS1. Solenoid A has in series therewith normally closed contacts R1c and a group of parallel normally open contacts R3e, R4c and R6e. The solenoid B has in series therewith normally open contacts R1d. It will be observed that when relay R1 remains energized, which will indicate passage of an undersize gear, normally open contacts R1d will be closed to complete a circuit to the solenoid B when condition limit switch LS1 returns to its upper position, as it will do upon passage of the gauged gear through the master gears 10 and 12. Energization of the solenoid B opens trap door 80 and permits the undersize gear to fall into a convenient receptacle or conveyor. Since this gear is undersize already it cannot be salvaged by further operations. If however, relay R1 has been opened due to the fact that the gear passing through the gauge is of either proper size or oversize, then normally closed contacts R1c remain closed and a circuit is completed to the solenoid A through whichever one of the normally open contacts R3e, R4c or R6e are closed. Contact R3e will be closed if the gear is oversize. Contacts R4c will be closed if the gear exhibits left hand helix angle error. Contacts R6e will be closed if the gear exhibits right hand helix angle error. Accordingly, if any of these three above mentioned errors are present in the gear, solenoid A is energized and trap door 78 is raised and the gear drops into a suitable receptacle or conveyor. Any of these gears may be reworked and hence are salvageable.

If the only relays remaining energized after passage of a gear therethrough are the relays R2 and R5 neither of the solenoids A or B is energized and the gear which exhibits no disqualifying error as to size or helix angle passes completely across the supporting surface and actuates the lever 126 on its downward passage from the machine. Passage of the gear from the machine in any case will operate relay R7 and hence will clear all of the relays R1 through R6 remaining energized at that time.

If the gear being gauged exhibits one of the four disqualifying errors, this error is used to energize counting devices which are connected in the circuit. Counting devices of this type are well known and include windings which are periodically energized and adapted upon each energization to shift a contact element one step. After a predetermined number of steps the contact element is adapted to complete an external circuit. The counting devices also include reset windings which when energized serve to clear the accumulated count in the device and return the movable contact to initial position. Conveniently, the counting device may be set to complete the external control circuit after a count of three, which is the condition illustrated in the present circuit. Counting devices of this type are available from the Guardian Electric Company of Chicago, identified as Guardian series stepping relays, series M.E.R.

The counting devices are four in number, the first being adapted to count undersize gears and including an actuating winding C1a and a reset winding C1b. In series with the counting windings C1a are normally open contacts R8a which are closed when a gear is rejected for any cause, and normally open contacts R1e which are closed if the rejected gear is undersize. The contacts designated C1a(3) are the contacts which are adapted to be closed after the coil C1a has been energized a predetermined number of times, as for example the three times referred to in the present case. It will be observed that closure of contacts C1a(3) establishes a circuit to relay R9 and to signal light 160. Energization of relay R9 in turn opens normally closed contacts R9a in series with the master relay M1, thus opening contacts M1a, M1b, M1c and M1d and terminating operation of the gauging apparatus as well as operation of the gear finishing apparatus with which the gauging apparatus is normally associated.

Energization of relay R9 after three consecutive undersize gears have passed through the apparatus also closes normally open contacts R9b which connect line L2c to the reset coil C1b, thus resetting the counting device to zero. Normally open contacts R2c are in series with the reset coil C1b. Thus, if a gear of proper size follows an undersize gear, energization of relay R2 will complete a circuit through contacts R2c to the reset coil and set the counter back to zero.

Energization of relay R9 also closes the normally open contacts R9c, thus establishing a circuit through the relay R9 independent of contacts C1a(3) to the reset line L2C. This retains relay R9 energized after operation of the gauging apparatus and automatic operation of the gear finishing machine or machines has been terminated and will keep signal light 160 energized to provide an indication to the operator what gear defect resulted in termination of the gear finishing and gauging operation. In the assumed case, the three consecutive gears which terminated the operation were undersize. It is assumed that conceivably a properly operating gear finishing machine may act upon a roughed-out gear having such characteristics that in the single shaving operation, these defects may not be fully overcome, so that the presence of a single gear in the gauging apparatus which exhibits one or more defects is not a true indication of an error in the gear finishing machine which requires adjustment or resetting. However, if three consecutive gears through the gauging apparatus exhibit the same error or errors, it is almost a certainty that the difficulty is due to an error which has come about as a result of erroneous setting or adjustment of the gear finishing machine. This condition may occasionally be brought about after a continued operation as a result of temperature change, to cite one possible condition.

After the operator has noted the erroneous gear characteristic or characteristics which resulted in shutting down of the system and has made the necessary adjustments, the operation is resumed by pushing the start-reset switch SW3 and restarting the shaving machine. First movement of the switch breaks the circuit to the rest line L2c, thereby breaking the circuit to relay R9 and hence opening normally open contacts R9b and R9c and closing normally closed contacts R9a. Thereafter, the initiation of operation is as before described.

The counting and control mechanism for oversize off-helix angle left and off-helix angle right gears is similar and the same system of reference numerals is applied thereto. Thus, the counter for oversize gears includes the counting coil C2a and the reset coil C2b. The counting device for off-helix angle left gears includes the counting coil C3a and the reset coil C3b. The counting device for off-helix angle right gears includes the counting coil C4a and the reset coil C4b.

In series with the counting coil C2a are normally open contacts R8b and R3f. Reset coil C2b is in series with normally open contacts R8b and includes in series therewith parallel normally open contacts R1f and R2d. A branch line connects the reset coil C2b through normally open contacts R10b to the reset line L2c. Relay R10 is in parallel with signal light 158 and these together are in series with normally open contacts C2a(3). A branch line containing normally open contacts R10c connects relay R10 to the reset line L2c.

The mechanism for counting gears exhibiting left hand helix angle error comprises the counting coil C3a in series with normally open contacts R8c and R4e. The reset coil C3b for gears exhibiting left hand helix angle error is in series with normally open contacts R5d which connect it to the line L2a, and a branch line including normally open contacts R11b connects reset coil C3b to the reset line L2c. Relay R11 in parallel with signal light 162 is connected to line L2a through normally open contacts C3a(3) and is connected to the reset line L2c through normally open contacts R11c.

In the mechanism for counting gears exhibiting right hand helix angle error the counting coil C4a is in series with normally open contacts R8d and R6f. The reset coil C4b is connected to line L2a through normally open contacts R4d and normally open parallel contacts R4f and R5e. A branch line connects reset coil C4b to normally open contacts R12b. Relay R12 is in parallel with signal light 164 and is connected to line L2a through normally open contacts C4a(3). Relay R12 and signal light 164 are connected to reset line L2c through normally open contacts R12c.

Without attempting to trace the many variations of the circuit in further detail, it will be observed that to start the gauging apparatus, with the switch CW1 closed, it is only necessary to press the start-reset button, which starts the operation of the gauging apparatus and results in lighting of the signal light 152 which is normally green. Tripping the thermal overload devices on switch SW1 will stop the gauge motor M, but the gauge circuit will remain energized and the gear finishing machine, controlled by the contacts M1d, will still operate.

Opening the gauge stop switch SW2 will stop the gauge, extinguish the green signal light 152, and stop the operation of the shaving machine immediately.

When a gear enters the gauge master gears 10 and 12, its size and helix angle are transmitted to the condition limit switches by the arm 36. Limit switches LS1, LS2 and LS3 indicate underside, good size, and oversize in that order. Limit switches LS4, LS5 and LS6 indicate off-helix angle left, good helix angle, and off-helix angle right in that order. With no gear between the master gears the lever arm 36 is spring loaded to rest below the undersize range and to the left of the off-helix angle left range. An oversize gear with off-helix angle right error will actuate all condition limit switches to reach its final signal. All counting and trap door action is delayed by the back or upper contacts of limit switch LS1 until limit switch LS1 returns to its illustrated position after actuation by a gear.

Any gear passing through the gauge that does not contain any of the previous errors counted will reset those circuits to zero and count its own errors, if any.

The undersize chute or conveyor will accept all undersize gears regardless of helix condition. The oversize chute or conveyor will accept oversize gears with a helix angle error and good gears with helix angle error. The only gears that will enter the good chute or conveyor are correct both as to size and helix angle.

When a gear falls through any of the three chutes, a limit switch is tripped which will de-energize all condition relays R1 through R6 and close any open chute doors in preparation for the next gear.

When three gears in a row pass through the gauge with any one error, either alone or in combination with others, the respective signal lights 158, 160, 162, or 164 go on, the gauge is shutdown, the green light 152 is turned off, and the gear finishing machine is stopped immediately.

Pressing the start-reset button will cause the gauge to start and reset the error count only on the circuit that counted out. The count that has been accumulated on the other circuits will remain.

Referring now to Figures 8A and 8B there is shown a variation of the circuit which causes the gear gauging apparatus to determine the percentage of gears rejected for any cause out of the total number of gears gauged. This circuit is in part very similar to the circuit described in conjunction with Figure 7 and the description of the similar parts of the circuit will be set forth only briefly.

The circuit comprises the same limit switches LS1 through LS9 respectively, which are connected to relays R1 through R7 in the same manner as previously described.

The circuit differs however, in that it is designed to count the total number of gears rejected for any cause and to determine the percentage of rejects from the total number gauged so as to terminate operation of the gear shaving machine when the percentage of rejects exceeds a predetermined minimum.

The circuit also includes means for separating good gears from gears which are undersize and accordingly scrap, and gears which are either oversize or off helix angle and which are therefore salvageable. For this purpose the circuit includes gate solenoid A in series with normally closed relay contacts R1c and in series with parallel connected normally open contacts R3e, R4c and R6e, this circuit being connected to line L2a through the upper contact of limit switch LS1. Accordingly, when a gear is rejected as oversize or off helix angle, one of the contacts R3e, R4c and/or R6e will be closed when limit switch LS1 closes its upper contact, and at that time the circuit will be completed through normally closed contact R1c to solenoid A, thus opening the gate and causing the gear to be collected with other oversize or off helix angle gears.

In like manner, gate solenoid B is connected in series with normally open contact R1d and the upper contact of limit switch LS1. Thus, an undersize gear which will have closed normally open contact R1d will cause solenoid B to be energized and the undersize gear to be collected with others of its kind.

This portion of the circuit controlled by limit switch LS1 also includes normally open contacts R1x, R3x, R4x, and R6x connected in parallel and in series with relay R18 so that relay R18 is energized upon return of limit switch LS1 to upper position whenever the gear gauged was rejected for any cause whatsoever. The second relay R19 is provided in series with normally open relay contacts R2x and R5x. A gear which is good in all gauged characteristics will have energized relays R2 and R5 so that normally open contacts R2x and R5x will be closed when limit switch LS1 returns to its upper position. Accordingly, relay R19 will be energized when each satisfactory gear is gauged. As a result of this every gear passing through the machine will cause either relay R18 or R19 to be energized.

A counter CC1 is connected in series between lines L1a and L2a in series with parallel normally open contacts R18a and R19a so that the counter CC1 will be energized once for every gear gauged by the machine. The counter CC1 includes a reset coil CC1a which is connected in series with contacts CC1(100) which means the 100th pair of contacts on the counter CC1, when closed, will complete a circuit to the reset coil CC1a thereof, thus resetting counter CC1 to zero.

Contacts CC1(100) also complete a circuit to relay R21, thus closing normally open contacts R21b, R21c and R21d.

In order to determine the percentage of rejected gears, additional counters CC2, CC3 and CC4 are employed in conjunction with a tandem selector switch SS. Counter CC2 has its counting coil energized after counter CC1 has counted a predetermined number of gears as determined by the selector switch SS. The selector switch SS includes an adjustable contact SS1 adapted to connect any desired contact of counter CC1 to relay R20. Where the arrangement is designed to terminate operation of the machine when the percentage of rejected gears reaches ten percent, adjustable contact SS1 is set to the illustrated position to complete a circuit to counter contact CC1(20), which is the contact on counter CC1 engaged by the movable contact of the counter when its counting coil has been energized twenty times. At this time a circuit is completed from line L2a through counter contact CC1(20), through contact SS1, through normally closed contacts R21a to relay R20. Energization of relay R20 closes normally open contacts R20a, thus locking in relay R20 and also closing normally open contacts R20b, completing a circuit to the counting coil of relay CC2. Prior to energization of relay R20, energization of relays R18 or R19 actuated counter CC1, but had no effect on counter CC2. After energization of relay R20 however, each energization of relays R18 or R19 results in energization of counter CC2. This has the effect of causing counter CC2 to pick up a count after counter CC1 has counted a predetermined amount and counter CC2 will thereafter continue to count. However, counter CC2 includes a reset coil CC2a which is connected through movable contact SS2 of the selector switch SS to a predetermined contact on counter CC2. In the illustrated embodiment of the invention, selector switch contact SS2 is shown as connected to contact CC2(10) which means that when counter CC2 has counted ten a circuit is completed to reset coil CC2a and counter CC2 is thereupon reset to zero.

In addition, counter CC3 is provided and is connected in series with normally open contacts CC2(1) which indicates contacts closed when counter CC2 has counted one. Accordingly, operation of counter CC1, CC2 or CC3, together with selector switch SS, as thus far described, is as follows: Each gear, either good or bad, results in counter CC1 counting once. After a predetermined delay as determined by the position of selector arm SS1, counter CC2 starts to count. When counter CC2 counts one, a circuit is completed to the counting coil of counter CC3. Thereafter, counter CC2 continues to count to a predetermined number, such for example as ten with the illustrated setting, at which time counter CC2 is reset to zero and immediately resumes counting. Upon the first count of its second series of ten, counter CC3 is again energized. Accordingly, counter CC3 counts once every time counter CC2 starts to count a new series of ten.

A fourth counter CC4 is provided which has a series of contacts connected to predetermined contacts on counter CC3. As illustrated herein, contact 2 of counter CC4 is connected to zero position contact of counter CC3, contact 3 of counter CC4 is connected to the contact at the No. 1 position of counter CC3, etc., the last contact No. 12 of counter CC4 being shown as connected to the contact at the No. 10 position of counter CC3.

The counter CC4 includes a winding in series with normally open relay contacts R18b so that counter CC4 counts once for every bad gear gauged by the machine. If at any time the movable contact of counter CC4 reaches a stationary contact thereon which at that moment is connected through a stationary contact on the counter CC3 to the movable contact thereof, a circuit is completed from line L2a through relay R22 which opens normally closed contacts R22a, thus terminating operation of the gauging apparatus and the gear finishing machine controlled thereby. Specifically, the circuit is interrupted to the motor relay M, thus opening normally open motor relay contacts Ma and Mb. In addition, energization of relay R22 closes normally open contacts R22b, R22c, R22d, R22e and R22f. Closure of contacts R22b or R21b energizes reset coil CC2a. Closure of contacts R22c or R21c energizes reset coil CC3a of counter CC3. Closure of contacts R22d or R21d energizes reset coil CC4a of counter CC4. Closure of contacts R22e energizes reset coil CC5a of a counter CC5 whose function will presently be described. Closure of contacts R22f completes a circuit to a signal light indicated at L.

Counter CC5 is connected in the same manner as the counters described in connection with Figure 7 and includes contacts CC5(3) which when closed complete a circuit to the relay R22 previously described. The reset winding CC5a of the counter CC5 also includes in series therewith normally open contacts R19b which reset counter CC5 every time a good gear passes through the gauging apparatus. Thus, counter CC5 is effective to de-energize the gauging apparatus and gear finishing machine only when a predetermined number of consecutive bad gears (as for example three) are passed through the gauging apparatus.

It will be observed that operation of counter CC5 is entirely independent of the percentage control, and in fact, the consecutive bad gears which interrupt the operation of the gauging apparatus may include the last gear of a series of 100 as counted on counter CC1 and the first gear of a following series of 100 gears.

Described in general terms, it will be observed that the percentage control involves actuation of counter CC4 every time a bad gear passes through the gauging apparatus and periodic actuation of counter CC3. Thus, counter CC3 may be considered as completing a circuit progressively to one contact after another on the counter CC4. When the movable contact of counter CC4 engages the energized stationary contact thereof, it is an indication that a predetermined percentage as determined by the selector switch SS has been equaled or exceeded and energizes the relay R22.

In the embodiments of the invention as thus far described the operation of the gauging apparatus is to terminate further gear finishing operation when a predetermined number of consecutive gears exhibit any defect or the same defect or when a predetermined percentage of total gears gauged exhibits some defect.

Reference has been made herein to lights to indicate the nature of any defect which causes the machine to shut down. These indicating lights, together with the means for shutting down the machines, constitute signal means to signal the operator that a machine adjustment is required.

The drawings and the foregoing specification constitute a description of the improved automatic gear gauging apparatus in such full, clear, concise and exact terms as to enable any person skilled in the art to practice the invention, the scope of which is indicated by the appended claims.

What I claim as my invention is:

1. Automatic gear gauging apparatus comprising a first master gear mounted for rotation on a fixed axis, means for driving said first master gear in slow rotation, a second master gear adjacent said first master gear and normally spaced therefrom a distance requiring even an undersize work gear to enter into full mesh with both of said master gears with the axes of said master gears generally parallel, means mounting said second master gear for angular movement about an axis perpendicular to and substantially intersecting the axes of both of said master gears, and for movement generally toward and away from said first master gear, a trackway leading from said master gears, and electrical means associated with said trackway and responsive to movement of said second master gear for separating gears passing between said gauge gears according to size and helix angle.

2. Apparatus as defined in claim 1 in which the means for separating gears comprises trap doors in said trackway.

3. Automatic gear gauging apparatus comprising a first master gear mounted for rotation on a fixed axis, means for driving said first master gear in slow rotation, a second master gear adjacent said first master gear and normally spaced therefrom a distance requiring even an undersize work gear to enter into full mesh with both of said master gears with the axes of said master gears generally parallel, means mounting said second master gear for angular movement about an axis perpendicular to and substantially intersecting the axes of both of said master gears, and for swinging movement about a second axis spaced from and parallel to the axis of said first master gear in a direction generally toward and away from said first master gear, a trackway leading from said master gears, and means associated with said trackway and responsive to movement of said second master gear for separating gears passing between said gauge gears according to size and helix angle, said means for separating gears comprising an arm connected to said second master gear for movement therewith, and separate means responsive respectively to angular and swinging movement of said second master gear.

4. Gear gauging apparatus comprising a first master gear, a second master gear spaced from said first master gear a distance such that even an undersize work gear must mesh fully with both of said master gears to pass therebetween and movable toward and away from said first master gear to gauge the pitch diameter of a gear passing between said master gears, and angularly movable about an axis perpendicular to and substantially intersecting the axes of said master gears to gauge the helix angle of a gear passing therebetween.

5. Gear gauging apparatus comprising a first master gear, a second master gear spaced from said first master gear a distance such that even an undersize work gear must mesh fully with both of said master gears to pass therebetween and movable toward and away from said first master gear to gauge the pitch diameter of a gear passing between said master gears, and angularly movable about an axis perpendicular to and substantially intersecting the axes of said master gears to gauge the helix angle of a gear passing therebetween, and means for rotating one of said master gears to feed a gear to be gauged between said master gears.

6. Gear gauging apparatus comprising a pair of master gears located with their axes generally parallel and spaced to provide for passage of even an undersize work gear therebetween in fully meshed relation therewith, means for rotating one of said master gears to feed a work gear between the master gears, means mounting the other master gear for angular movement about an axis perpendicular to and substantially intersecting the axes of said master gears and for rocking movement about another axis parallel to and spaced from the axes of said master gears in position to provide for movement of said other master gear toward and away from said one master gear, and means for measuring pitch diameter and helix angle of work gears fed between said master gears comprising an arm connected to said other master gear for movement therewith.

7. Apparatus as defined in claim 6, and resilient means biasing said arm and stop means locating said arm in a position corresponding to undersize pitch diameter of a work gear and off-helix angle thereof to require movement of said arm about both pivot axes of said other master gear upon passage of an accurate work gear therethrough.

8. Apparatus as defined in claim 7 in which said resilient means is effective to oppose a stronger resistance to movement of said arm about the axis parallel to and spaced from the axes of said master gears to prevent measurement of off-helix angle as an oversize condition.

9. Apparatus as defined in claim 6 which comprises a trackway along which work gears advance after passing between said master gears, said trackway including movable separating means actuated automatically by said measuring means for separating gears of correct size and helix angle from the remainder.

10. Apparatus as defined in claim 9 in which said movable separating means comprise trap doors normally occupying a portion of said trackway but movable about horizontal axes to a position blocking the trackway and uncovering a space through which a work gear drops.

11. Gear gauging apparatus comprising a frame, a first master gear, means on said frame mounting said first master gear in fixed position for rotation about its axis, a second master gear spaced from said first master gear a distance such that even an undersize work gear must mesh fully with both of said master gears to pass therebetween with its axis generally parallel thereto, means mounting said second master gear for movement toward and away from said first master gear and for angular movement about an axis perpendicular to and substantially intersecting the axes of both of said master gears, means for preventing rotation of said second master gear about its axis, and means for rotating said first master gear to roll a work gear over said second master gear and between both of said master gears.

12. Apparatus as defined in claim 11 comprising means engageable by a work gear effective to prevent contact thereof with said second master gear until said work gear is fully meshed with said first master gear.

13. Gear gauging apparatus for measuring the pitch diameter of a gear without reference to any possible helix angle error in the gear which comprises a master gauge element, means mounting said element for movement radially of the gear to be gauged, said master gauge element including a tooth-shaped portion adapted to enter into a tooth space of the gear being gauged and to engage the teeth at opposite sides of the tooth space, means mounting the master gauge element for rocking movement about an axis perpendicular to and intersecting the axis of the gear to be gauged and passing substantially centrally through the tooth-shaped portion of the gauging element to permit the tooth-shaped portion of the gauging element to align itself longitudinally of the tooth space so as to permit entry of the tooth-shaped portion of the gauging element to full depth in the tooth space irrespective of any possible helix angle error in the gear being gauged, and measuring means responsive to movement of the gauging element radially of the gear being gauged to measure pitch diameter of the gear independently of any possible helix angle error present therein.

14. Automatic gear gauging apparatus comprising a frame, a first master gear mounted on said frame for rotation about a fixed axis, a second master gear, means movably mounting said second master gear on said frame adjacent said first master gear for movement away from said first master gear from a position in which spacing between said master gears is less than that required to accommodate any work gear within the size range expected and for angular movement about a first mounting axis perpendicular to the axis of said second master gear and intersecting the axis of said first master gear when said second master gear is at a predetermined position within its range of movement toward and away from said first master gear, an arm having one end fixedly secured to said second master gear, a plurality of switches in position to be actuated by the free end of said arm upon movement thereof resulting from movement of a work gear between said master gears, guide means on said frame along which work gears pass after being gauged, said guide means including movable portions for establishing a plurality of different paths for a work gear, and solenoids controlled by said switches for actuating the movable portions of said guide means to separate work gears into classes dependent upon which switches were actuated by said arm.

15. Apparatus as defined in claim 14 in which the means mounting said second master gear for movement toward and away from said first master gear is pivot means providing a second mounting axis, and said arm is elongated to produce multiplied motion of its free end as compared to motion of said second master gear.

16. Apparatus as defined in claim 15, said switches comprising three positioned to be actuated in sequence by movement of said arm about said second mounting axis as said arm moves from rest position through a first position corresponding to an undersize work gear, and a second position corresponding to a normal size work gear, to a third position corresponding to an oversize work gear.

17. Apparatus as defined in claim 15, said switches comprising three positioned to be actuated in sequence by movement of said arm about said first mounting axis as said arm moves from rest position through a first position corresponding to a work gear having a lead error of one hand, and a second position corresponding to a work gear of proper lead to a third position corresponding to a work gear having a lead error of opposite hand.

18. Automatic gear checking apparatus for checking a series of work gears comprising means for advancing work gears singly to a checking station, a drive gear at said checking station, a master gear at said checking station spaced from said drive gear with its axis substantially parallel to the axis of said drive gear and spaced from the drive gear a distance such that movement of a work gear into the space between said drive and work gears causes displacement of said master gear away from said drive gear, motor means connected to said drive gear to rotate said drive gear to advance a work gear into the space between said drive gear and master gear in meshed relation to both said master and drive gear, a support mounting said master gear for movement toward and away from said drive gear, resilient means urging said support toward said drive gear to insure full meshing of said master gear with a work gear, swivel means on said support mounting said master gear thereon for angular displacement about an axis substantially perpendicular to and intersecting the axes of said master and drive gears in accordance with helix angle variations in work gears in mesh with said master gear, and means for measuring one of the aforesaid displacements of said master gear resulting from its fully meshed engagement with a work gear.

19. Automatic gear checking apparatus for checking a series of work gears comprising means for advancing work gears singly to a checking station, a drive gear at said checking station, a master gear at said checking station spaced from said drive gear with its axis substantially parallel to the axis of said drive gear and spaced from the drive gear a distance such that movement of a work gear into the space between said drive and work gears causes displacement of said master gear away from said drive gear, motor means connected to said drive gear to rotate said drive gear to advance a work gear into the space between said drive gear and master gear in meshed relation to both said master and drive gear, a support mounting said master gear for movement toward and away from said drive gear, resilient means urging said support toward said drive gear to insure full meshing of said master gear with a work gear, swivel means on said support mounting said master gear thereon for angular displacement about an axis substantially perpendicular to and intersecting the axes of said master and drive gears in accordance with helix angle variations in work gears in mesh with said master gear, and means for measuring the angular displacement of the master gear resulting from its fully meshed engagement with a work gear as a measurement of the helix angle of the work gear.

20. Apparatus as defined in claim 19 which comprises a pivot mounting for said support having an axis substantially parallel to the axes of said master and drive gears, and located to cause pivoting of said support to cause said master gear to move substantially directly toward and away from said drive gear.

21. Automatic gear checking apparatus for checking a series of work gears comprising a frame having a checking station, means for advancing work gears singly to said station, a pair of check gears at said station, one of said check gears comprising a rotatable drive gear, the other of said check gears comprising a master gear spaced from said drive gear with its axis substantially parallel to the axis of said drive gear and spaced from said drive gear a distance such that movement of a work gear into the space between said check gears causes relative displacement between said check gears away from each other, motor means connected to said drive gear to rotate said drive gear to advance a work gear into the space between said check gears in meshed relation to both of said check gears, movable support means on said frame mounting one of said check gears for movement toward and away from the other check gear, resilient means connected to said support to urge said support toward said other check gear, swivel means mounting one of said check gears for angular displacement about an axis substantially perpendicular to and intersecting the axes of said check gears in accordance with helix angle variations in work gears at said checking station, and means for measuring one of the aforesaid displacements of a check gear resulting from its fully meshed engagement with a work gear.

22. Automatic gear checking apparatus for checking a series of work gears comprising a frame having a checking station, means for advancing work gears singly to said station, a pair of check gears at said station, one of said check gears comprising a rotatable drive gear, the other of said check gears comprising a master gear spaced from said drive gear with its axis substantially parallel to the axis of said drive gear and spaced from said drive gear a distance such that movement of a work gear into the space between said check gears causes relative displacement between said check gears away from each other, motor means connected to said drive gear to rotate said drive gear to advance a work gear into the space between said check gears in meshed relation to both of said check gears, movable support means on said frame mounting one of said check gears for movement toward and away from the other check gear, resilient means connected to said support to urge said support toward said other check gear, swivel means mounting one of said check gears for angular displacement about an axis substantially perpendicular to and intersecting the axes of said check gears in accordance with helix angle variations in work gears at said checking station, and means for measuring the angular displacement of the check gear mounted for angular displacement resulting from its fully meshed engagement with a work gear at said checking station as a measurement of helix angle of the work gear.

23. Apparatus for gauging gear work pieces and the like comprising, in combination, gauge means including a movable gauge element shaped to fit into a tooth space of a gear work piece in contact with the teeth at both sides of the tooth space, said element having contact portions spaced longitudinally within the tooth space to be aligned with the teeth at opposite sides of said tooth space, support means spaced from said element and cooperating with said element to support, one at a time, all gear work pieces being tested and acting as a fixed reference for all gear work pieces being tested, means mounting said element for movement toward and away from said support means, and for swivel movement about an axis extending radially of the gear work piece being gauged and extending through said element, and guide means positioned to receive the gear work pieces from said gauge means and including movable means responsive to movement of said element in the direction toward and away from said support means when a gear work piece moves between said element and said fixed reference means and therebeyond for separating said gear work pieces by size as a function of the movement of said element without the introduction of apparent size errors attributable to lead or helix error 24. Apparatus as defined in claim 23 in which said element is in the form of a gear tooth conjugate to the gear work piece.

25. Apparatus as defined in claim 23 in which said guide means further comprises movable means responsive to swivel movement of said element when a gear work piece moves between said element and said fixed reference means and therebeyond for separating said gear work pieces by lead or helix angle as a function of the swivel movement of said element.

26. Gear gauging apparatus for gauging a series of gears one at a time in succession comprising a gauging station and a guideway for receiving gears from said gauging station, movable gauging means engageable with work gears at said gauging station for measuring the size and helix angle thereof, said guideway including movable separating means responsive to movement of said gauging means operable to separate gears of proper size and helix angle from the remainder.

27. Gear gauging apparatus for gauging a series of gears one at a time in succession comprising a gauging station and a guideway for receiving gears from said gauging station, movable gauging means engageable with work gears at said gauging station for measuring the size and helix angle thereof, said guideway including movable separating means responsive to movement of said gauging means operable to separate gears of proper size and helix angle from the remainder, said movable separating means being arranged to be moved only when a gauged gear is found to be of improper size or helix angle.

28. Gear gauging apparatus for gauging a series of gears one at a time in succession comprising a gauging station and a guideway for receiving gears from said gauging station, movable gauging means engageable with work gears at said gauging station for measuring the size and helix angle thereof, said guideway including movable separating means responsive to movement of said gauging means operable to separate gears of proper size and helix angle from the remainder, said movable separating means being connected to said movable gauging means to separate the gears into a first group consisting of the gears of proper size and helix angle, a second salvageable group consisting of oversize or incorrect helix angle gears, and a third group of undersize scrap gears.

29. Gear gauging apparatus comprising means for measuring the size and helix angle of a series of gears one at a time in succession, comprising a first master gear, a second master gear spaced from said first master gear a distance sufficient that even an undersize work gear must mesh fully with both of said master gears to pass therebetween, said second master gear being movable toward and away from said first master gear to gauge the sides of a gear passing between said master gears, said second master gear being also angularly movable about an axis perpendicular to and substantially intersecting the axes of said master gears to gauge the helix angle of a gear passing therebetween, a trackway over which the series of gears advances after measurement, and automatic means responsive to the measuring means for separating the gears into a first group consisting of gears of required size and helix angle, a second salvageable group consisting of gears of oversize or incorrect helix angle gears, and a scrap group consisting of gears which are undersize.

30. Gear gauging apparatus comprising automatic gauge means for gauging a series of gears one at a time in succession, guide means in position to receive gauged gears from said gauge means and including movable separating means responsive to said gauge means to separate acceptable from rejected gears, a pair of counters each having a series of fixed contacts and a movable contact movable serially over said fixed contacts, conductors connecting individual fixed contacts of a series of one counter to individual fixed contacts of the series of the other counter, means responsive to rejection of each gear for advancing the movable contact of one counter from one fixed contact thereof to the next, means responsive to passage of a predetermined number of gears through the apparatus to advance the movable contact of the other counter from one fixed contact to the next, and a control circuit including a relay and including two interconnected contacts on said counters and both movable contacts for terminating operation of said apparatus when the circuit is completed.

31. Gear gauging apparatus for measuring the pitch diameter and helix of a gear which comprises a master gauge element, means mounting said element for movement radially of the gear to be gauged, said master gauge element including a tooth-shaped portion adapted to enter into a tooth space of the gear being gauged and to engage the teeth at opposite sides of the tooth space, means mounting the master gauge element for rocking movement about an axis perpendicular to and intersecting the axis of the gear to be gauged and passing substantially centrally through the tooth-shaped portion of the gauging element to permit the tooth-shaped portion of the gauging element to align itself longitudinally of the tooth space so as to permit entry of the tooth-shaped portion of the gauging element to full depth in the tooth space irrespective of any possible helix angle error in the gear being gauged, measuring means responsive to movement of said master gauge element about the aforesaid axis to measure the helix angle of the gear, and measuring means responsive to movement of the gauging element radially of the gear being gauged to measure pitch diameter of the gear independently of any possible helix angle error present therein.

32. Gear gauging apparatus for gauging a series of gears one at a time in succession comprising a gauging station and a guideway for receiving gears from said gauging station, movable gauging means engageable with work gears at said gauging station, said guideway including movable separating means responsive to movement of said gauging means operable to separate acceptable gears from rejected gears, counter means for counting successive groups of gauged gears, each formed of a predetermined number of successive gears, acceptable and rejected, gauged by the gauging means, said counter means having a first counter comprising a movable contact, a series of fixed contacts with which said movable contact is sequentially engageable, and means for advancing the movable contact of said first counter from one to the next adjacent fixed contact each time said predetermined number of gears have ben gauged, a second counter for counting the total number of gears rejected, said second counter comprising a movable contact, a series of fixed contacts with which the movable contact of said second counter is sequentially engageable, and means for advancing the movable contact of said second counter from one to the next adjacent fixed contact each time a gear is rejected, connections between certain of the fixed contacts of said first counter and fixed contacts of said second counter, and a signal circuit including the movable contacts of both of said counters and said connections, signal means actuated when a circuit is completed through said signal circuit to indicate attainment of a predetermined minimum ratio of rejected gears to the total number of gears gauged, the connections between stationary contacts of said counters being arranged to require the consecutive counts on said first counter periodically after each predetermined number of gears has been gauged to increase the number of rejected gears counted by said second counter required to actuate the signal means.

References Cited in the file of this patent
UNITED STATES PATENTS

| | | |
|---|---|---|
| 2,542,090 | Lorenz | Feb. 20, 1951 |
| 2,587,664 | Stout | Mar. 4, 1952 |
| 2,591,124 | Boyan | Apr. 1, 1952 |
| 2,612,995 | Kahle et al. | Oct. 7, 1952 |
| 2,616,068 | McDonald | Oct. 28, 1952 |
| 2,664,557 | Sargrove | Dec. 29, 1953 |
| 2,712,408 | Weber | July 5, 1955 |
| 2,761,560 | Pomernacki | Sept. 4, 1956 |
| 2,803,342 | Gates | Aug. 20, 1957 |
| 2,815,579 | Bassoff | Dec. 10, 1957 |
| 2,877,895 | Drader | Mar. 17, 1959 |
| 2,905,320 | Gates | Sept. 22, 1959 |

OTHER REFERENCES

"Gear-Testing Fixture," by Gus H. Froelich, Machinery, July 1925, pages 888–889. Copy in 33–179.52.

"Continuous Blank Machining in Gear Production," by J. J. McCabe, "Automation," June 1955, pages 26–29.

"Versatility Accentuated in Continuous Gear Production," by C. E. Scott, "Automation," April 1955, pp. 47–53.